United States Patent [19]
Cox

[11] Patent Number: 5,257,510
[45] Date of Patent: Nov. 2, 1993

[54] SCRAPER APPARATUS FOR FREEZER DRUMS

[75] Inventor: Gary B. Cox, Philo, Ill.

[73] Assignee: Kraft General Foods, Inc., Northfield, Ill.

[21] Appl. No.: 992,740

[22] Filed: Dec. 18, 1992

[51] Int. Cl.⁵ ............................................. F25C 5/12
[52] U.S. Cl. ................................ 62/346; 15/256.51
[58] Field of Search ............... 62/346, 354; 15/256.51; 165/94

[56] References Cited

U.S. PATENT DOCUMENTS

| | | | |
|---|---|---|---|
| 904,231 | 11/1908 | Schou et al. | 62/346 X |
| 4,098,095 | 7/1978 | Roth | 62/346 |
| 4,349,575 | 9/1982 | Roth | 62/346 X |
| 4,528,716 | 7/1985 | Perneczky | 15/256.51 |
| 4,700,551 | 10/1987 | Nyrup | 62/354 X |
| 4,872,780 | 11/1990 | Gasparrini et al. | 15/256.15 X |
| 4,906,335 | 3/1990 | Goodnow et al. | 15/256.51 X |

*Primary Examiner*—William E. Tapolcai
*Attorney, Agent, or Firm*—Fitch, Even, Tabin & Flannery

[57] ABSTRACT

An ice scraping system including a scraper blade driven by a pneumatic cylinder coupled to an electropneumatic controller Distance of the blade from the surface being scraped is continuously monitored by a command controller which specifies different electrical command signals for the electropneumatic control device.

16 Claims, 2 Drawing Sheets

SCRAPER APPARATUS FOR FREEZER DRUMS

BACKGROUND OF THE INVENTION

1. Field of the Invention

The present invention pertains to apparatus for scraping the outer cooling surfaces of freezer drums, and in particular to the scraping of freezer drums to remove frost and ice formations thereon.

2. Description of the Related Art

Rotating drums having outer refrigerated surfaces are used for continuous cooling or freezing of products brought in contact with the refrigerated surface. For example, U.S. Pat. No. 4,349,575 describes a "blanket" of meat material in paste form applied to the outer surface of a rotating drum. The drum is refrigerated so as to freeze the paste material, which is removed from the drum surface as a flat, continuous sheet. The drum freezer is operated at temperatures which cause ambient moisture in the operating environment to accumulate on the drum surface as frost or ice. A stationary scraper blade scrapes across the drum surface to remove accumulated moisture which has been transformed into a solid. An evacuated hood surrounds the scraper blade and removes the scraped material from the operating environment.

U.S. Pat. No. 4,332,143 to Soecknick, et al. discloses a movable ice scraper disposed at the intake of a gas cooling device. The heat transfer portion of the device and the ice scraper have telescopic, tubular forms, with the tubular ice scraper traveling within the heat transfer tube. An external piston, having a central axis generally parallel to the axis of the ice scraper tube, is connected thereto, to reciprocate the ice scraper within the heat transfer tube. The ice scraper tube is operated periodically to remove ice which has formed in the bore of a heat transfer tube.

U.S. Pat. No. 4,662,183 also discloses a tubular heat exchanger with an internal piston scraping the tube bore to remove ice formed thereon, harvesting the ice for subsequent consumption. U.S. Pat. No. 2,549,215 also discloses an arrangement for harvesting ice, and employs a trip hammer which beats against a freezer drum surface to break ice accumulated thereon. The broken ice is collected for subsequent consumption.

Swept surface or scraped surface heat exchangers are also known in the art. For example, U.S. Pat. No. 2,930,058 discloses a tubular freezing chamber having a central axis. Scraper blades mounted for rotation about the axis scrape the tube bore to remove frozen materials formed thereon. U.S. Pat. No. 2,867,987 also discloses a rotating scraper in the bore of a freezing apparatus.

U.S. Pat. No. 1,966,099 discloses a defroster for removing accumulations from the refrigerator coils of ice making machines. A lever mounted on a rotating wheel is disposed above the refrigerator coil. When frost and ice accumulated on the refrigerator coil are built up to a preselected thickness, the lever is tripped, initiating a heated defrost cycle.

Other arrangements for detecting frost and ice buildup on a refrigerator surface, for initiating a defrost cycle, may take other forms. For example, U.S. Pat. Nos. 4,348,869 and 4,428,206 employ ultrasonic transducers to monitor frost and ice accumulation, either directly by using echo-ranging techniques, or indirectly, by measuring deflection of a mechanical probe.

As can be seen from the above, and as will be appreciated by those skilled in the art, commercial production facilities using freezer drums in production operations typically require some means for controlling the accumulation of frost and ice on the freezer surfaces in order to maintain efficient heat transfer rates. Despite advances provided by the above, a need still exists for an improved frost and ice removal system which is suitable for either automatic or semiautomatic operation.

SUMMARY OF THE INVENTION

It is an object according to principles of the present invention to provide a frost and ice removal system for a rotating freezer drum.

Another object according to principles of the present invention is to provide an automated control system for an ice scraper blade in contact with a moving freezer surface.

Yet another object according to principles of the present invention is to provide a control system which provides either automatic or semiautomatic operation for an ice scraper blade.

These and other objects according to principles of the present invention are provided in an ice scraping apparatus for scraping the surface of a drum freezer, comprising:

a scraper blade;

means for mounting the scraper blade adjacent the surface, for movement toward and away from the surface;

actuating means for moving the scraper blade toward and away from the surface in response to an actuating signal;

command means for generating a plurality of pressure command signals; and actuating control means having a first input coupled to said command means and an output coupled to said actuating means, said actuating control means sending a plurality of actuating signals to said actuating means in response to said plurality of pressure command signals so as to cause said actuating means to apply a plurality of corresponding different pressures to the scraper blade.

DETAILED DESCRIPTION OF THE PREFERRED EMBODIMENTS

Figure 1:
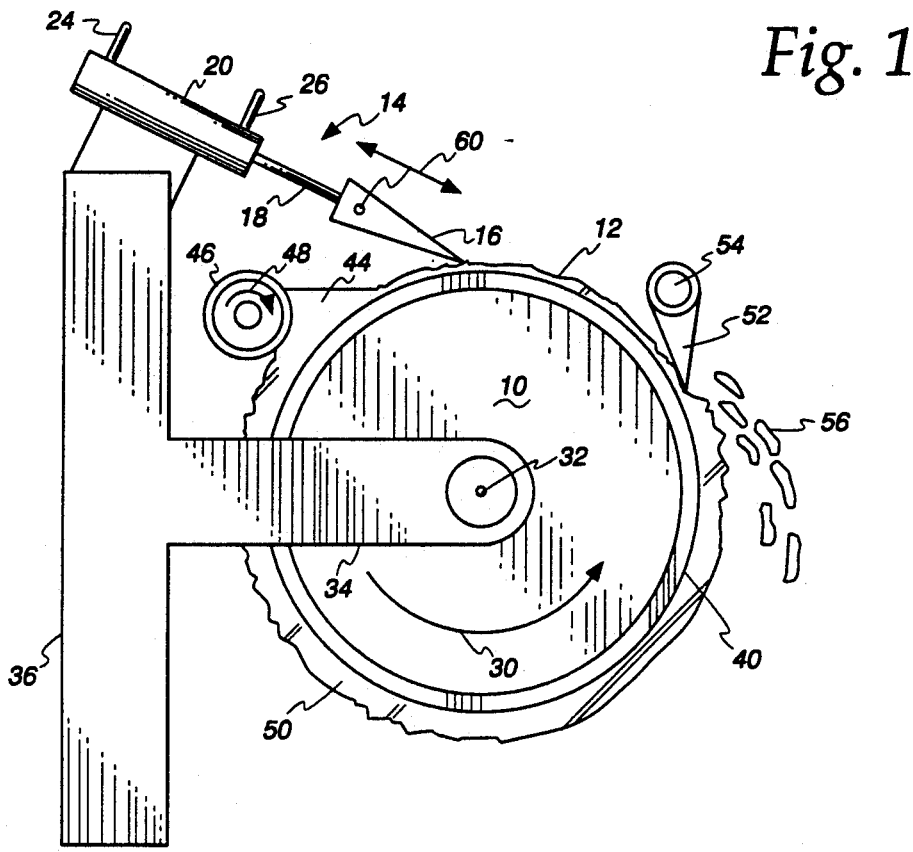
FIG. 1 is a schematic, side elevational view of a freezer drum and scraper apparatus according to principles of the present invention.

Turning now to the drawings, and initially to FIG. 1, a freezer drum 10 is mounted for rotation in the direction of arrow 30 by a shaft 32 and by an arm 34 in a support structure 36. The freezer drum 10 is preferably hollow, so as to be at least partly filled with a refrigerant, such as ammonia, or a cryogen, such as liquid nitrogen, for example. The refrigerant within the drum 10 absorbs heat through the drum surface 40 so as to cool or freeze the product placed in contact with the drum surface. A product 44, such as a viscous paste of hamburger or vegetable protein, is metered by metering roll 46 rotating in the direction of arrow 48, to form a blanket 50 covering the surface 40 of drum 10. As mentioned, drum 10 is driven in the direction of arrow 30 and is rotated at a relatively slow speed. Metering roller 46 is also preferably driven by its own power source, but may alternatively be rotated in the direction of arrow 48 by reason of the frictional coupling provided by product 44 which passes between roller 46 and drum 10. A product removal blade 52 is mounted on shaft 54 and has a tip which scrapes the product from the surface of drum 10, forming flakes 56. Blade 52 may also form a continuous sheet of frozen product material, depending upon the characteristics of the product, and the thickness of the blanket 50. The freezer drum, metering roller and product removal blade are of conventional, construction similar to that shown in U.S. Letters Pat. No. 4,349,575, for example, the disclosure of which is herein incorporated by reference as if fully set forth herein.

That portion of the surface of freezer drum 10 lying between product removal blade 52 and metering roller 46 is scraped "clean" of the product and is exposed to the ambient environment until covered again with product 44. Ambient moisture contacting the surface of the freezer drum will condense and undergo a phase change so as to form, for the most part, either ice (rime) or frost (hoarfrost). As used herein, rime refers to an accumulation of granular ice tufts on the freezer drum surface and is associated with an undercooled fog or cloud surrounding the freezer drum. Rime typically resembles a nonuniform crust formation somewhat similar to snow crust, as opposed to hoarfrost which is of a more uniform, homogenous composition generally less dense and substantially thinner than the rime accumulation.

It has been observed, throughout many production runs, that moisture will first accumulate on the surface 40 of drum 10 as hoarfrost or frost and will thereafter accumulate over much longer periods of time, as rime. The underlying frost may be either completely or mostly transformed into rime. As will be seen herein, the scraper control afforded by the present invention takes into the account the different types of moisture accumulation and adjusts the blade pressure, and may also adjust the depth of "cut" in a corresponding manner. These accumulations will be described as "frost" and "ice", implying at least a coarse differentiation between the different types of frozen moisture accumulation on the drum surface.

As those skilled in the art are aware, moisture accumulation on a freezer drum is rarely uniform across the drum surface, but more frequently resembles a rough terrain highlighted by peaks or nodules of ice. The local high spots of the frozen moisture terrain are leveled off by scraping for ice and frost control; but, although preferred, it is not always desirable to scrape down the freezer drum surface absolutely "clean" so as to be totally devoid of moisture accumulation. If the drum is scraped clean, moisture will tend to accumulate as frost before the scraped portion of the drum returns to the scraper blade. However, if scraping is not taken all the way down to the drum surface, then a relatively thin coating of moisture will be present on the freezer drum at all times, with the coating varying in thickness, density and hardness throughout the operating cycle of the equipment. For most applications of the drum freezer apparatus, the product 44 tends to be "softer" than the frozen moisture, and it is possible to effectively remove all of the product with the removal blade 52. However, as described herein, if a layer of frozen moisture is allowed to pass underneath the product removal blade, the layer must be dealt with if effective heat transfer rates for the freezer operation are to be maintained.

Figure 2:
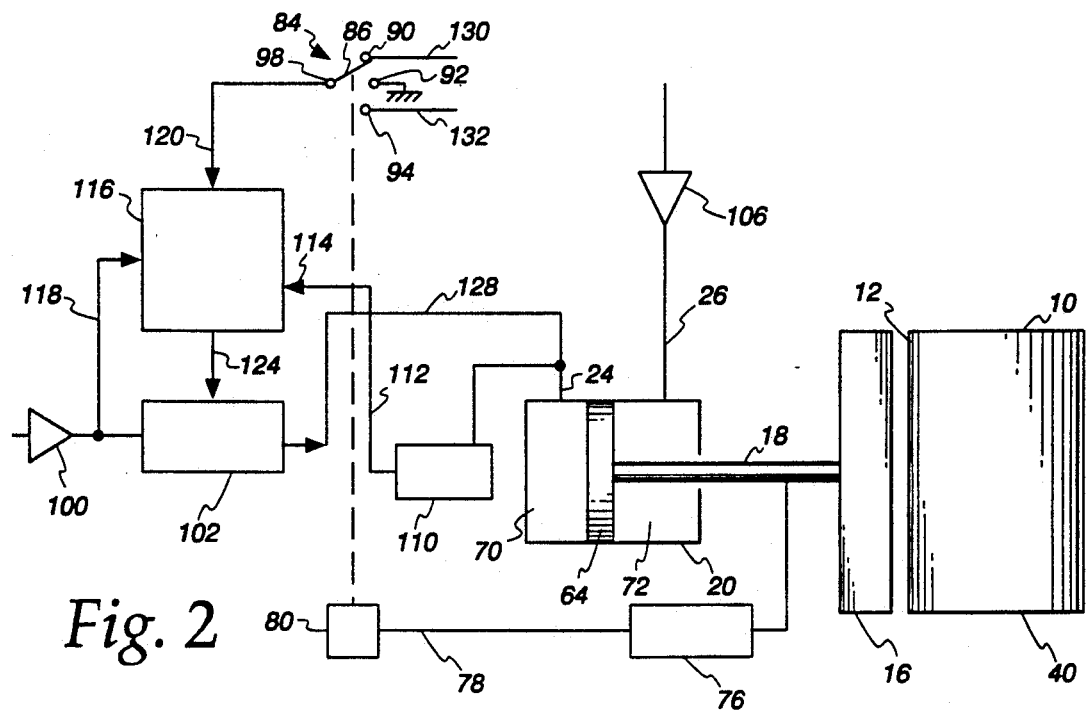
FIG. 2 is a schematic diagram of the scraper apparatus.
Figure 3:
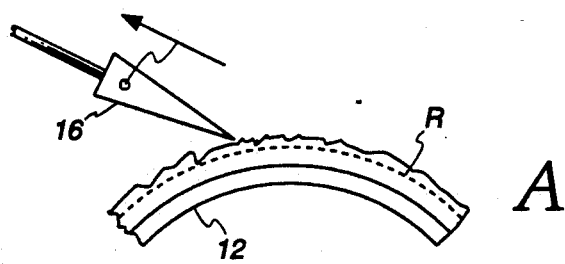
FIGS. 3A-3D show a sequence of an ice scraping operation.
Figure 3:
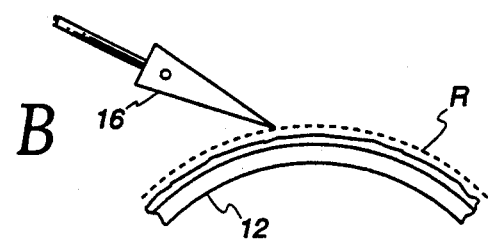
Figure 3:
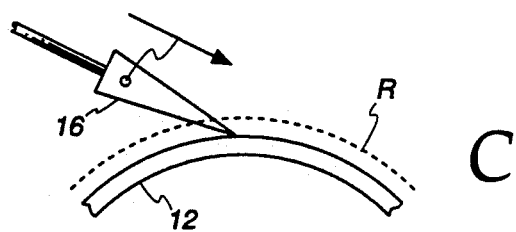
Figure 3:
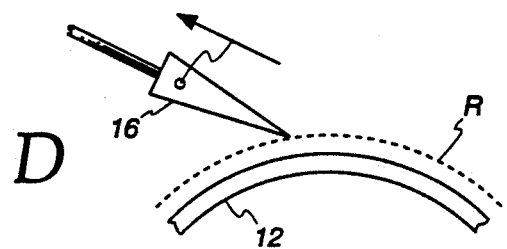

According to one aspect of the present invention, a scraper blade 16 is provided at a portion of the drum surface located downstream of product removal blade 52. As indicated in the schematic diagram of FIG. 2, the scraper blade 16 preferably covers the entire width of drum 10. Blade 16 is mounted on shaft 18 for movement toward and away from the drum surface, as indicated by arrow 60. Shaft 18 is connected to a piston 64 disposed within an actuating means or pneumatic cylinder 20. The piston divides the cylinder into expansion and retraction chambers 70, 72 having inlet connection ports 24, 26, respectively. As pressure is applied to inlet connection port 24, extension chamber 70 is pressurized and expanded, moving shaft 18 and scraper blade 16 toward the surface of drum 10. As pressure in inlet connection port 24 is reduced or pressure in inlet connection port 26 is increased, shaft 18 and blade 16 are retracted away from the surface of drum 10. Thus, through a variety of pressure signals applied to pneumatic cylinder 20, blade 16 can be moved back and forth in the direction of arrow 60 (see FIG. 1).

The position of shaft 18 is monitored by position transducer 76 which sends an output signal along line 78 to a command port control means or a programmable logic controller 80, which preferably comprises either a digital or analog controller. Controller 80 is coupled to a switch 84 so as to move contact 86 to one of three connection means, or terminals, 90-94. The output of switch 84 appears on terminal 98, which is connected to moveable contact 86. Thus, the position of switch 84 corresponds to one of three positions or range of positions of scraper blade 16. As will be seen herein, transducer 76, controller 80 and switch 84, including command signals inputted to the switch, together comprise a command means for sending command signals to an eletropneumatic control device 116.

As mentioned above, cylinder 20 is preferably pneumatically operated. Two pressure sources are indicated in the schematic diagram of FIG. 2—a first pressure source 100 coupled through pressure control element 102 to extension chamber 70, and a second pressure source 106 coupled to retraction chamber 72. If desired, the pressure sources 100, 106 can be derived from a common pressure source, with or without intermediate pressure regulating equipment. As will be seen herein, it is preferred that cylinder 20 be operated at two different pressure levels (or ranges of pressure).

The pressure inputted through port 26 to retraction chamber 72 is preferably not monitored for feedback control, although such is possible. However, the pressure inputted through port 24 to extension chamber 70 is monitored by a transducer 110, which develops a corresponding secondary feedback signal or output signal on line 112 coupled to an input 114 of control device 116. In functional terms, input 114 comprises a secondary loop feedback port. The control device 116 includes an input port 118 coupled to pressure source 100 and an input port 120 coupled to output terminal 98 of switch 84 to receive electrical command signals therefrom. Control device 116 includes an output port 124, coupled to pressure control element 102, to control the pressure on line 128 fed into input port 24 of cylinder 20. There is a primary feedback loop internal to control device 116 which maintains a pressure output signal at port 124 for a given electrical signal inputted at port 120. The pressure signal is fed back through transducer 110 to input port 114 in a secondary feedback loop. A first electrical command signal is fed along line 130 to switch terminal 90 to provide a first control set point for control device 116. A second command signal is fed on line 132 to terminal 94, providing a second set point for control device 116, producing a corresponding pressure output on line 128 inputted to extension chamber 70.

Although virtually any type of control signal is contemplated by the present invention, it is preferred that the control signals on lines 130, 132 comprise a positive DC voltage, causing control device 116 to output two corresponding pressures in line 128 and hence in extension chamber 70 The third terminal 92 of switch 84 provides a reference position for blade 16 at a point fully retracted from drum 10, i.e., a "park" position for the scraper blade. Terminal 92 is shown connected to an electrical ground, although those skilled in the art will appreciate that a positive or negative signal could also be applied to terminal 92 to cause blade 16 to move to an inoperative stored position used during shutdown.

In the preferred embodiment, control device 116 comprises an electropneumatic control, commercially available from Proportion-Air, Inc., McCordsville, Ind., as Model "BB2." In the preferred embodiment, the command signal on line 130 comprises a 6 volt DC signal, which causes an approximately 40 psi signal to be produced on line 128, which is inputted to extension chamber 70. The command signal on line 132 preferably comprises a 2 volt DC signal, producing approximately a 10 psi signal on line 128.

The pressure at input 26 in the preferred embodiment comprises a constant pressure ranging between 5 and 30 psi. Thus, with a relatively low pressure on port 26, and a higher pressure on port 24, a net positive pressure is applied to piston 64, driving blade 16 toward the surface 40 of drum 10. With the pressure on port 26 held constant, an increase in pressure at port 24 will increase the pressure of the blade applied to surface 40. Generally speaking, a lower pressure is applied to blade 16 for scraping frost, and a substantially higher pressure is applied to blade 16 for scraping rime or ice.

A fully automatic control system is preferred. However, if desired, semiautomatic operation is also possible with the control system, according to the present invention. In the semiautomatic control system, the transducer 76 and controller 80 are not used, and can be eliminated, with switch 84 being controlled manually by a machine operator who visually determines the condition of the freezer drum surface and initiates appropriate scraping of the drum. Other aspects of the control system may remain unchanged, being used for fully automatic, as well as semiautomatic, operation. Prior to machine start-up, scraper blade 16 is (optionally) fully retracted, with switch 84 moved to the center "off" position mating with contact 92 Under semiautomatic operation of the ice control system, an operator will determine from the visual appearance of the freezer drum surface whether frost or ice (rime) covers the freezer drum surface. Depending upon the type of frozen accumulation present, the operator will manipulate switch 84 so as to contact either terminal 90, for ice accumulation, or terminal 94, for frost accumulation. A relatively high voltage, (e.g., on the order of several volts) direct current voltage source is preferred for the command signal, in fully automatic, as well as semiautomatic, operation described here. The higher voltage signal is coupled to terminal 90 and is applied through switch 84 to control device 116 which produces a relatively high pressure signal on line 128 inputted to the first port 24 of cylinder 20. The pressure signal in line 28 is sufficient to overcome the pressure signal in line 26 and to drive scraper blade 16 toward surface 40 of drum 10 and to maintain a constant, higher pressure of blade 16 against the ice buildup. After a sufficient time, ice buildup is removed from the drum surface, leaving the drum either substantially clean, or with a thin covering of frost. The operator then manipulates switch 84, coupling the lower voltage command signal on line 132 through terminal 94 to the input 120 of control device 116. The lower voltage command signal (e.g., 0.2 volt) at the input of control device 116 produces a lower pressure signal in line 128. In a fully automatic operation, switch 84 is operated by controller 80, as will be seen below. Whether operation is fully automatic or semiautomatic, the command signal on line 132 and the resulting pressure signal in line 128 is preferably maintained at a single constant level. The pressure in line 128 inputted to port 24 of cylinder 20, although lower, is sufficient to overcome the constant pressure inputted to port 26 and to drive scraper blade 16 toward the surface 40 of drum 10 with a constant, lower pressure.

The resistance experienced by scraper blade 16 as it travels over the coated surface of drum 10 is continually changing because the surface is relatively rough, uneven and nonuniform in both a radial direction and also in a "Z axis" direction, from end to end of drum 10. As piston 64 is moved back and forth in response to travel of blade 16 over the unevenly-coated surface of drum 10, pressure variations tend to develop in line 128. Disposed within control device 116 is a first feedback loop which sets the output at 124 to a value corresponding to the electrical input at port 120. According to one aspect of the present invention, an optional secondary feedback loop may be provided, whether operation is fully automatic or semiautomatic. Transducer 110 monitors the pressure signal to input port 24 and feeds back a corresponding electrical monitor signal to secondary feedback loop port 114. A comparator within control device 16 compares the monitor signal at port 114 with the reference command signal at port 120 and adjusts control operation, altering the output signal on port 124 to provide a further control of the signal applied to cylinder 20.

As mentioned, in the semiautomatic mode of operation, the position sensor 76 and controller 80 are not required, and may be disconnected or omitted, if desired. In the fully automatic mode of operation, the scraper blade is controlled in response to signals from the distance sensor 76. Initially, after a machine shutdown, switch 84 contacts terminal 92, allowing the pressure signal applied to port 26 to move the scraper blade to a fully retracted position When operation of the drum freezer is desired, an operator will either energize a de-energized distance sensor 76 or controller 80, or, alternatively, will couple their outputs through a switch to the circuitry, the coupling being performed in the manner indicated in FIG. 2.

Upon initial start-up, control device 116 will apply a preselected pressure at input port 24, urging the scraper blade toward the surface of drum 10. Two alternative modes of fully automatic operation are possible. In the most preferred mode of fully automatic operation, the initial, preselected pressure is set at the higher level, with the scraper blade being driven at the higher pressure level until contact with the drum surface is noted.

Such contact can be confirmed by comparing the signal from transducer 76, which should indicate maximum extension of the scraper blade.

Alternatively, as mentioned above, the moisture accumulations on the drum surface are uneven, and accordingly, it may be assumed that, if a constant, undisturbed blade pressure is sensed for a complete revolution of the freezer drum, then the blade is in direct contact with the drum surface, and that no uneven, intervening layer of moisture accumulation is present. In either event, with the most preferred mode of fully automatic operation, once contact of the scraper blade with the drum surface is established, operating pressure is then automatically switched to the second, lower level, it being assumed that, with continual uninterrupted scraping of the freezer drum surface, only frost will be encountered. If desired, output from distance transducer 76 can be continuously monitored, and if it is found that the scraper blade has "backed off" from its fully extended position (indicating moisture accumulation remaining and building despite continual scraping), then commands can be issued in controller 82, with switch 84 calling for a higher blade pressure.

In a second, less preferred mode of fully automatic operation, it is assumed that the moisture accumulation on the drum surface is stratified, usually with layers of different densities or hardness characteristics. Such stratified phenomena may be encountered when the drum cooler surface is subjected to widely varying environmental conditions. For example, a drum freezer may initially be subjected to ambient conditions in which a frost layer is first built up on the drum surface. Thereafter, moisture accumulation may be in the form of an ice layer overlying the frost layer. The frost layer may be wholly or partly converted to ice. Also, frost may accumulate on the outer surface of the ice. Other types of strata formation are, of course, possible, depending on the operating environment involved, and the principles shown here can be readily adapted to varying strata conditions.

Strata information, i.e., the expected thicknesses of frost and ice accumulation to be encountered on the surface of drum 10, is stored in controller 80. Based on this stored information, and the distance of blade 16 from the surface of drum 10, the type of moisture accumulation on drum 10 is inferred when initial contact of the blade with the drum surface is detected. For example, if blade 16 encounters resistance at a very short distance from the surface of drum 10, the coating encountered is assumed to be the underlying coating of frost. If, however, as is typical after a prolonged shutdown, the distance from the drum surface 40 at which blade 16 encounters resistance is relatively long, it is assumed that the accumulation contacted is ice rather than frost. Based on experience, a typical distance at which a transition between layers is encountered is estimated, and this information is stored in controller 80. Accordingly, controller 80 interprets the type of moisture accumulation based upon the distance readings inputted to it on line 78.

Assuming, for example, that the drum freezer has been shut down for some time and a layer of frost has accumulated on the drum surface, with a layer of ice accumulating above that, an operator energizes the scraper blade control system and a pressure is applied to input port 24 of cylinder 20, urging blade 16 toward the drum surface The distance from the drum at which resistance is encountered by the scraper blade is transmitted from transducer 76 to controller 80. Assuming the distance is relatively long, controller 80 interprets the long distance as indicating the presence of ice formation on the drum surface. In a preferred embodiment, switch 84 applies electrical signals to a relay which establishes contact between wiper 86 and terminals 90-94. Controller 80 applies either electrical signals to the relay, or establishes a magnetic field which moves wiper 86, the connection indicated by the dotted line in FIG. 2.

Controller 84, according to a stored program, moves wiper 86 to terminal 90, applying a first, higher pressure to input port 24 of cylinder 20. As a consequence, blade 16 is urged toward drum 10 at a first, higher pressure suitable for removing ice accumulation. The pressure at input port 24 is maintained by primary operation of control device 116, in response to the command signal at input port 120 and also by secondary operation of the feedback control loop with signals inputted to port 114 from transducer 110. As pressure is applied, the distance of blade 16 from freezer drum 10 decreases, indicating progress in the scraping operation.

Eventually, the distance of blade 16 will decrease to a critical threshold stored in controller 80, indicating a transition to be made from one mode of operation to the other. The distance signal on line 78 corresponding to this transition point is sensed by controller 80, which responds by switching the command signals inputted to port 120 from command line 130 to command line 132. Blade 16 is maintained at a second, lower constant pressure during the frost scraping cycle. If desired, controller 80 can be programmed so as to remove pressure on blade 16 when distance of the blade to the drum surface is sufficiently small so as to indicate a minimal frost buildup on the drum surface.

Accordingly, in this less preferred mode of fully automatic operation, controller 80 is programmed so as to recognize layers or ranges of accumulation thicknesses on the drum surface and to command different pressure settings for the scraper blade while the blade is operating in the different thickness ranges. As mentioned, it is also preferred that the pressure on the scraper blade be maintained constant over a preselected accumulation thickness range. However, other arrangements for controller 80 are also possible. For example, pressure on blade 16 over a particular accumulation thickness range can be made to decrease either linearly or nonlinearly with respect to instantaneous accumulation thickness as sensed by the blade 16. Also, if desired, additional thickness ranges can be recognized by controller 80 to apply different pressure settings on blade 16. For example, a third band or thickness range can be defined for the transition between ice and frost, and controller 80 can be programmed to command an intermediate pressure for the scraper blade, i.e., a pressure lying between the aforementioned ice-scraping and frost-scraping pressures.

Additionally, controller 80 can be programmed in different ways. For example, it has been mentioned that the frozen moisture accumulation on the drum surface, whether in the nature of frost or ice, is generally uneven, with localized peaks and valleys. When blade 16 encounters a localized peak, the blade is driven back into cylinder 20 for a brief instant as the blade attempts to level the localized peak. The number and intensity of these "kick-back" excursions of the scraper blade can be monitored either by position transducer 76 or pressure transducer 110, and appropriate action can be taken.

For example, the number and frequency of blade excursions can be monitored by controller 80 to determine if blade pressure should be increased, either over a long term, or alternatively, a constantly changing dynamic pressure is also possible If desired, controller 80 can be coupled to a tachometer measuring the rotation of drum 10 to identify an out-of-round condition caused by a concentration of localized peaks at a given radial position, and controller 80 can then take appropriate action such as increasing blade pressure over a given angular portion of the drum surface.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Ice scraping apparatus for scraping the surface of a drum freezer, comprising:
    a scraper blade;
    means for mounting the scraper blade adjacent the surface, for movement toward and away from the surface;
    actuating means for moving the scraper blade toward and away from the surface in response to an actuating signal;
    command means for generating a plurality of pressure command signals; and
    actuating control means having a first input comprising a command port coupled to said command means and an output coupled to said actuating means, said actuating control means sending a plurality of actuating signals to said actuating means in response to said plurality of pressure command signals so as to cause said actuating means to apply a plurality of corresponding different pressures to the scraper blade.

2. The apparatus of claim 1 wherein said actuating control means further comprises a secondary loop feedback port for receiving secondary signals corresponding to and indicative of the actuating signals and said apparatus further comprises transducer means coupled to said output of said actuating control means to sense the actuating signals and to send the secondary signals to the secondary loop feedback port, and said actuating control means further comprises comparator means for comparing corresponding pressure commands and secondary signals and for altering the output of the actuating control means in response thereto.

3. The apparatus of claim 1 wherein said command means comprises distance detecting means for detecting distances of the scraper blade from the surface and for sending distance signals indicative thereof and command port control means coupled to said actuating control means for generating the plurality of pressure command signals corresponding to the distance signals.

4. The apparatus of claim 1 wherein said command means comprises plural connection means for connection to a plurality of pressure command signals and switch means coupled between said plural connection means and said actuating control means comprises means for selecting respective ones of said pressure command signals.

5. The apparatus of claim 4 wherein said plurality of pressure command signals comprises a plurality of direct current constant voltage signals and said actuating control means comprises an electropneumatic control device generating a plurality of pneumatic output signals of different pressures in response to different voltage signals applied to the command port of the actuating control means.

6. The apparatus of claim 1 wherein said actuating means comprises a double-ended cylinder with a first port coupled to said actuating control means, said first port extending the scraper blade toward the surface, and said cylinder further including a second port for retracting the scraper blade away from the surface.

7. The apparatus of claim 6 further comprising means for connecting a preselected constant pressure to said second port so as to continuously apply a preselected withdrawal pressure to said scraper blade which is overcome by said plurality of actuating signals.

8. Ice scraping apparatus for scraping the surface of a drum freezer, comprising:
    a scraper blade;
    means for mounting the scraper blade adjacent the surface, for movement toward and away from the surface;
    actuating means for moving the scraper blade toward and away from the surface in response to an actuating signal;
    distance detecting means for detecting the distance of the scraper blade from the surface and for sending a distance signal indicative thereof; and
    control means having a first input coupled to said distance detecting means and an output coupled to said actuating means, said control means sending a plurality of actuating signals to said actuating means in response to said distance signal so as to cause said actuating means to apply a plurality of corresponding different pressures to the scraper blade.

9. The apparatus of claim 8 wherein said actuating means comprises a double-ended cylinder with a first port coupled to said control means for extending the scraper blade toward the surface, and said apparatus further comprises a second port for retracting the scraper blade away from the surface.

10. The apparatus of claim 9 further comprising means for generating a preselected pressure signal coupled to said second port so as to continuously apply a preselected withdrawal pressure to said scraper blade which is overcome by said plurality of actuating signals.

11. The apparatus of claim 8 wherein said control means further comprises a second input port for receiving a plurality of pressure command signals and said apparatus comprises command means coupled to said second input port for generating a plurality of pressure command signals.

12. The apparatus of claim 8 wherein said actuating means comprises a double-ended cylinder with a first port coupled to said actuating control means, said first port extending the scraper blade toward the surface, and said cylinder further including a second port for retracting the scraper blade away from the surface.

13. Freezer drum apparatus having improved ice scraping means for scraping frozen moisture accumulation from the surface of a freezer drum, comprising:
    a freezer drum having an outer surface, at least a portion of which is exposed to the ambient environment;

means for mounting the freezer drum for rotation;
a scraper blade;
means for mounting the scraper blade adjacent the surface, for movement toward and away from the surface;
actuating means for moving the scraper blade toward and away from the surface in response to an actuating signal;
command means for generating a plurality of pressure command signals; and
actuating control means having a first input coupled to said command means and an output coupled to said actuating means, said actuating control means sending a plurality of actuating signals to said actuating means in response to said plurality of pressure command signals so as to cause said actuating means to apply a plurality of corresponding different pressures to the scraper blade, to urge the scraper blade toward the surface, into contact with frozen moisture accumulated thereon.

14. The apparatus of claim 13 wherein said actuating control means further comprises a secondary loop feedback port for receiving secondary signals corresponding to and indicative of the actuating signals, and said apparatus further comprises transducer means coupled to said output of said actuating control means to sense the actuating signals and to send the secondary signals to the secondary loop feedback port, and said actuating control means further comprises comparator means for comparing corresponding pressure commands and secondary signals and for altering the output of the actuating control means in response thereto.

15. The apparatus of claim 13 wherein said command means comprises distance detecting means for detecting distances of the scraper blade from the surface and for sending distance signals indicative thereof and command port control means coupled to said actuating control means for generating the plurality of pressure command signals corresponding to the distance signals.

16. The apparatus of claim 13 wherein said command means comprises plural connection means for connection to a plurality of direct current, constant voltage, pressure command signals and switch means coupled between said plural connection means and said actuating control means for selecting respective ones of said pressure command signals, and said actuating control means comprises an electropneumatic control device generating a plurality of pneumatic output signals of different pressures in response to different voltage signals applied to the first input of the actuating control means.

* * * * *